(No Model.)
J. DUNSTEDTER.
CAR WHEEL.
No. 417,996. Patented Dec. 24, 1889.
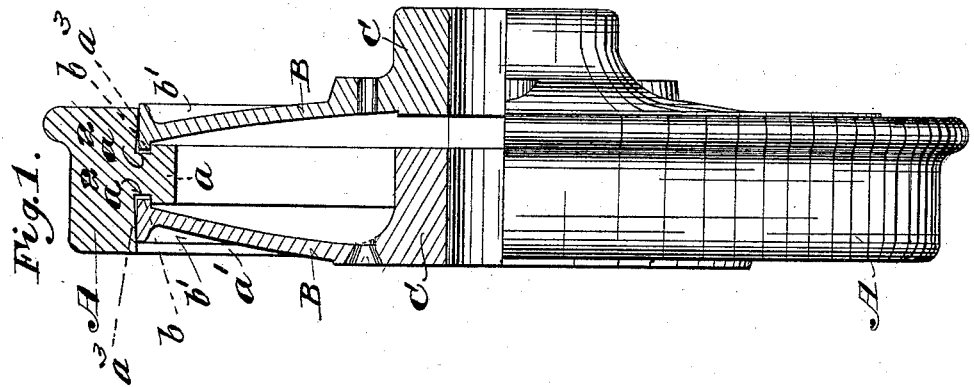
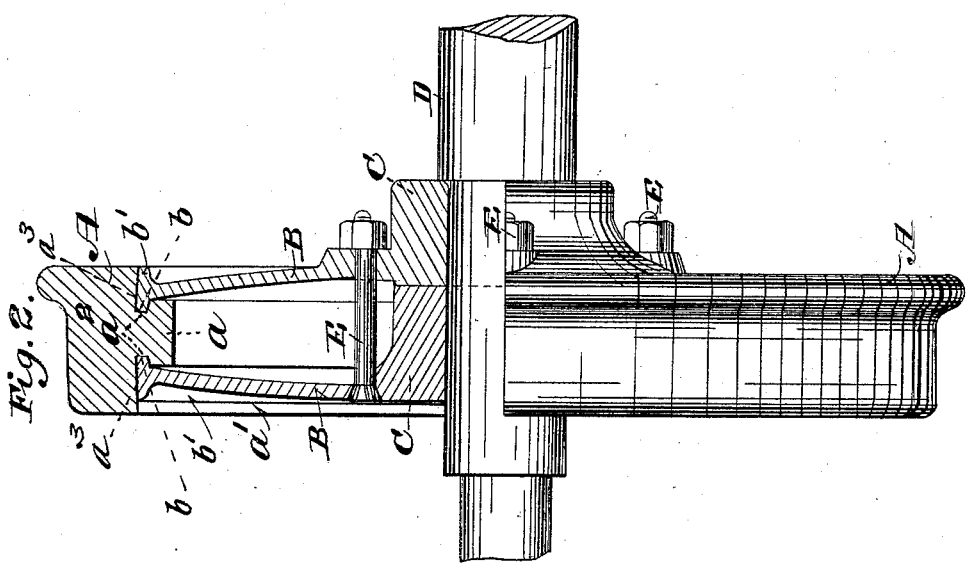
Witnesses:
J. W. E. Sanford
D. H. Hays
Inventor:
Jacob Dunstedter
by C. D. Moody
his atty
N. PETERS. Photo-Lithographer, Washington, D.C.

UNITED STATES PATENT OFFICE.

JACOB DUNSTEDTER, OF EDWARDSVILLE, ILLINOIS.

CAR-WHEEL.

SPECIFICATION forming part of Letters Patent No. 417,996, dated December 24, 1889.

Application filed September 4, 1889. Serial No. 322,996. (No model.)

*To all whom it may concern:*

Be it known that I, JACOB DUNSTEDTER, of Edwardsville, Illinois, have made a new and useful Improvement in Car-Wheels, of which the following is a full, clear, and exact description.

The invention relates to car-wheels of a composite nature, and having the web, consisting of disks, of springy material and adapted to be attached in position by springing them outward to bind at the periphery thereof against the rim and at the center thereof against the hub, or, when the web and hub are integral, against the axle.

The invention consists of the special means for uniting the web and rim and other features, substantially as is hereinafter set forth and claimed, aided by the annexed drawings, making part of this specification, in which—

Figure 1 is a view showing the improved wheel partly in edge elevation and partly in central section and the parts within the rim being as before the parts of the web are crowded together and against the rim; and Fig. 2, an analogous view, but showing the web parts closed together and against the rim.

The same letters of reference denote the same parts.

A represents the wheel-rim. It has a rib $a$ extending around its inner face $a'$, and grooves $a^2$ $a^2$, which are slightly inclined outward and toward the center of the wheel, are formed upon opposite sides, respectively, of the rib $a$, in which, respectively, are received the flanges $b$ $b$ of the disks B B. The disks B B are at the center thereof attached to the hub parts C C, respectively, and the hub part and disk at each side of the wheel are preferably integral, substantially as shown; but whether integral or not the wheel is completed as follows: The hub parts are arranged apart from each other upon the axle D, and the disks B B at the periphery thereof are engaged loosely in the grooves $a^2$ $a^2$. This position is represented in Fig. 1, saving that the car-axle is not shown in that figure. The hub parts are then forced and closed together upon the axle, and the parts thereby shifted into the position shown in Fig. 2, and after they are thus adjusted it may be desirable to employ tie-bolts E to more effectually secure the hub parts together upon the car-axle and substantially as represented in Fig. 2. The hub parts are fitted snugly to the axle, and hydraulic machinery or other suitable power is required to close them together, as described. As the hub parts are closed toward each other, the disks, whose inner portion necessarily follows the hub parts, are sprung radially toward the rim, and their peripheral portion is thereby fitted tightly to the rim, as shown in Fig. 2, and more particularly described as follows: The disks at the periphery thereof are provided not only with the inwardly-turned flange $b$, but also with the outwardly-turned flange $b'$. The two flanges $b$ $b'$, together with the thickness of the disk, constitute a broad bearing for the disk at its contact with the rim, and the outer flange $b'$ is of value in holding the disk from springing away from the rib $a$. The inner face of the rim at the points $a^3$, at which the disks bear thereon, instead of being parallel with the axle, are inclined thereto—that is, the end of the bearing toward the rib $b$ is farther from the axle than is the outer end. This operates to more effectually secure the peripheral portion of the disk in its position against the rim.

The outer surfaces of the grooves $a^2$, extended to the respective sides of the wheel form inclined bearing-surfaces $a^3$ $a^3$ for the aligned outer surfaces of the corresponding flanges $b$ $b'$. These bearing-surfaces $a^3$, being inclined outward and toward the center of the wheel, bind the flanges $b$ $b'$ of the disks B in position when the said disks have been sprung in place by forcing their hub portions C together, so that the edges of the disks cannot escape from position and the wheel is rendered stiff and compact throughout. By removing the bolts E, however, the wheel can have its parts quickly separated for repair or other purpose.

I claim—

1. In a car-wheel, the combination, with the rim provided with an interior circumferential rib having grooves $a^2$ on each side, which grooves incline outward and toward the center of the wheel and form similarly-inclined bearing-surfaces with the adjoining inside surface of the rim, of the disks having flanges $b$, which rest in said grooves, and flanges $b'$, which, with the adjoining flanges $b$, rest against said bearing-surfaces and are bound in position when the disks are sprung in place, substantially as specified.

2. In a car-wheel, the combination, with the axle and the rim provided with the interior rib $a$, grooves $a^2$, and bearing-surfaces $a^3$, which incline outward and toward the center of the wheel, of the disks B, having the flanges $b\ b'$, and hub portions C, and the bolts E, binding said disks together, substantially as specified.

Witness my hand this 26th day of August, 1889.

JACOB DUNSTEDTER.

Witnesses:
   C. D. MOODY,
   D. W. C. SANFORD.